US008040760B2

(12) United States Patent
Challener et al.

(10) Patent No.: US 8,040,760 B2
(45) Date of Patent: Oct. 18, 2011

(54) POLARIZATION NEAR-FIELD TRANSDUCER HAVING OPTICAL CONDUCTIVE BLADES

(75) Inventors: William Albert Challener, Sewickley, PA (US); Julius Kurt Hohlfeld, Wexford, PA (US); Adnan Rebei, Cranberry Township, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 163 days.

(21) Appl. No.: 12/252,966

(22) Filed: Oct. 16, 2008

(65) Prior Publication Data

US 2010/0097901 A1 Apr. 22, 2010

(51) Int. Cl.
G11B 11/00 (2006.01)
(52) U.S. Cl. ............... 369/13.29; 369/13.13; 369/13.33
(58) Field of Classification Search ............ 369/13.33, 369/13.13, 13.32, 112.16, 112.17, 112.18, 369/112.2, 112.21, 13.29; 360/59; 250/201.3, 250/201.5
See application file for complete search history.

(56) References Cited

U.S. PATENT DOCUMENTS

| | | | | |
|---|---|---|---|---|
| 4,551,819 A | | 11/1985 | Michl et al. ............ 365/120 |
| 5,689,480 A | * | 11/1997 | Kino .................... 369/14 |
| 6,611,492 B2 | | 8/2003 | Akimori et al. ......... 369/275.4 |
| 6,614,742 B2 | * | 9/2003 | Ueyanagi ............... 369/118 |
| 6,649,894 B2 | * | 11/2003 | Matsumoto et al. ...... 250/201.3 |
| 6,650,615 B1 | | 11/2003 | Yamamoto et al. ....... 369/275.1 |
| 6,714,370 B2 | * | 3/2004 | McDaniel et al. ........ 360/59 |
| 6,791,938 B2 | | 9/2004 | Endoh ................... 369/275.4 |
| 6,949,732 B2 | * | 9/2005 | Kiguchi et al. .......... 250/216 |
| 6,999,405 B2 | | 2/2006 | Endoh ................... 369/275.4 |
| 7,113,474 B2 | | 9/2006 | Ovshinsky et al. ....... 369/275.2 |
| 7,177,236 B2 | * | 2/2007 | Harchanko et al. ...... 369/13.33 |
| 7,245,562 B2 | * | 7/2007 | Ruigrok ................. 369/13.14 |
| 7,292,521 B2 | | 11/2007 | Ovshinsky et al. ....... 369/275.2 |
| 7,518,815 B2 | * | 4/2009 | Rottmayer et al. ........ 360/59 |
| 7,525,880 B1 | * | 4/2009 | Oumi et al. ............. 369/13.31 |
| 7,529,158 B2 | * | 5/2009 | Matsumoto et al. ...... 369/13.33 |
| 2001/0024421 A1 | | 9/2001 | Akimori et al. ......... 369/275.4 |
| 2002/0024915 A1 | | 2/2002 | Endoh ................... 369/109.02 |
| 2003/0048744 A1 | | 3/2003 | Ovshinsky et al. ....... 369/275.2 |
| 2003/0223316 A1 | * | 12/2003 | Saga et al. .............. 369/13.33 |
| 2004/0114913 A1 | | 6/2004 | Kume ................... 386/125 |
| 2004/0202056 A1 | | 10/2004 | Endoh ................... 369/13.55 |
| 2006/0221482 A1 | * | 10/2006 | Matsumoto et al. ...... 360/59 |
| 2006/0245333 A1 | | 11/2006 | Ovshinsky et al. ....... 369/112.23 |
| 2007/0041119 A1 | * | 2/2007 | Matsumoto et al. ...... 360/59 |
| 2007/0064544 A1 | * | 3/2007 | Okamoto ................ 369/13.33 |
| 2008/0109837 A1 | | 5/2008 | Anzai et al. ............. 720/718 |
| 2008/0122995 A1 | | 5/2008 | Kamada et al. .......... 349/2 |
| 2008/0165652 A1 | | 7/2008 | Misawa et al. .......... 369/94 |
| 2009/0040906 A1 | * | 2/2009 | Hong et al. ............. 369/112.23 |

OTHER PUBLICATIONS

C.D. Stanciu et al., "All-Optical Magnetic Recording with Circularly Polarized Light", Lett, vol. 99, (2007) pp. 047601.

* cited by examiner

*Primary Examiner* — Tan X Dinh
(74) *Attorney, Agent, or Firm* — Hollingsworth & Funk, LLC (57) ABSTRACT

In a particular embodiment, an optical transducer includes at least three optically conductive blades arranged symmetrically about a center gap. The optical transducer is adapted to receive polarized light from a light source and to focus the polarized light onto a recording medium while conserving polarization of the polarized light.

17 Claims, 11 Drawing Sheets

FIG. 11

POLARIZATION NEAR-FIELD TRANSDUCER HAVING OPTICAL CONDUCTIVE BLADES

FIELD OF THE INVENTION

This disclosure generally relates to polarization conserving near-field transducers for optical recording on magnetic media.

BACKGROUND OF THE INVENTION

A strategy for controlling media noise for high areal density recording involves reducing lateral dimensions of the magnetic particles or grains. The resulting reduction in grain volume is compensated by a corresponding increase in magnetic crystalline anisotropy energy density to ensure thermal stability of the stored data bits for an extended period of time, such as for a period of approximately ten years. Unfortunately, the high magnetic crystalline anisotropy of patterned media can support high areal densities, but also can hinder conventional writing.

Embodiments disclosed herein can provide solutions to these and other problems, and offer other advantages over the prior art.

SUMMARY OF THE INVENTION

In a particular embodiment, an optical transducer includes at least three optically conductive blades arranged symmetrically about a center gap. The optical transducer is adapted to receive polarized light from a light source and to focus the polarized light onto a recording medium while conserving polarization of the polarized light.

In another particular embodiment, a system is disclosed that includes a recording medium and a recording head movable relative to the recording medium. The recording head is adapted to focus polarized light onto a surface of the recording medium to record data via helicity induced optical switching, inducing formation of a rotating electrical field within the recording medium to represent a data value.

In still another particular embodiment, an optical transducer includes a plurality of optically conductive blades arranged symmetrically about a center gap. The optical transducer receives polarized light from a light source and focuses the polarized light onto a recording medium. The polarized light induces formation of a rotating electrical field within the recording medium via helicity induced optical switching.

DETAILED DESCRIPTION OF ILLUSTRATIVE EMBODIMENTS

Figure 1:
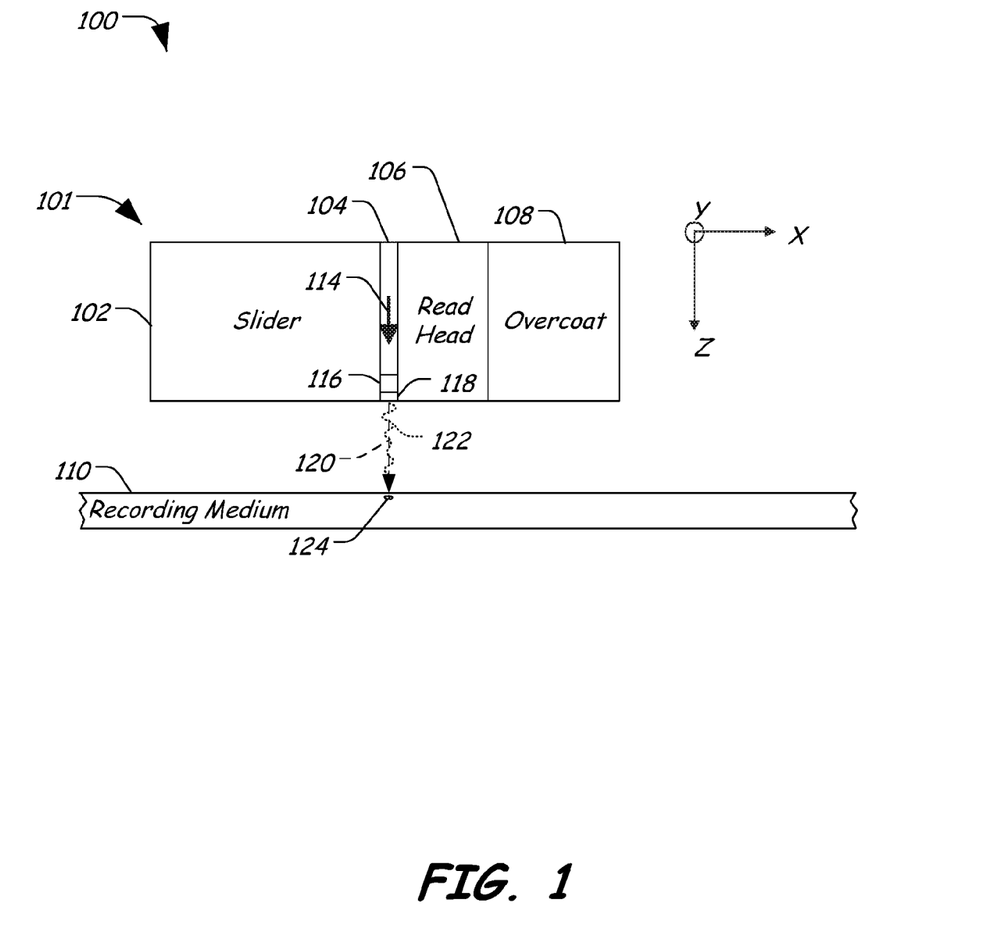
FIG. 1 is a block diagram of a particular illustrative embodiment of a system including a recording head with a polarization conserving, near-field transducer for optical recording on a magnetic storage medium.

FIG. 1 is a block diagram of a particular illustrative embodiment of a system 100 including recording head 101 having a waveguide 104 with a solid immersion lens 116 and a polarization conserving, near-field transducer 118 for optical recording on magnetic media, such as the recording media 110. The recording medium 110 is positioned in an X-Y plane that is perpendicular to a Z-axis of the waveguide 104. The recording head 101 includes an air-bearing slider 102 that flies over the surface of the recording medium 110. The slider 102 maintains a fly-height over the surface of the recording medium 110 in the Z-direction based on airflow. The slider 102 is adapted to position the waveguide 104 relative to the recording medium 110. The air-bearing slider 102 is also coupled to a read head 106, which can be adjacent to the waveguide 104. The recording head 101 further includes overcoat layer 108 that protects the recording head 101.

The waveguide 104 includes a solid immersion mirror and a solid immersion lens 116 to focus electro-magnetic radiation (light) 114 toward the surface of the recording medium 110. In a particular example, the electro-magnetic radiation 114 can include evanescent waveform energy due to surface Plasmon excitation induced by coupling with a light source. Further, the waveguide 104 includes a polarization conserving transducer 118 that is adapted to receive the focused electro-magnetic radiation 114 and to direct the focused electro-magnetic radiation 114 onto a surface of the recording medium 110 while conserving a polarization of the electro-magnetic radiation (light) 114.

Upon exiting the polarization conserving transducer 118, the polarized electro-magnetic radiation (light) is focused along the Z-axis as generally indicated by the dashed line 120. The polarized electro-magnetic radiation 120 includes an electrical field component and a magnetic field component that are out of phase, resulting in an electric field vector 122 that has a fixed amplitude and a direction that varies (rotates). In a particular example, the electrical field component and the magnetic field component can be ninety (90) degrees ($\square$/2 radians) out of phase. The electric field vector 122 can be referred to as "circularly polarized" since the tip of the electric field vector traces a circle at the surface of the recording medium 110. The polarized electro-magnetic radiation 120 enables focusing of the light to spot sizes of approximately 35 nm² and provides efficient coupling of the focused electromagnetic radiation 120. The rotating electrical field vector 122 induces formation of a rotating electrical field 124 within the recording medium 110. The rotating electrical field 124 represents a data value, which can be read by the read head 106.

The polarization conserving transducer 118 can yield a polarized electro-magnetic radiation 120 having a rectangular-shaped intensity profile. Further, the polarization conserving transducer 118 maintains the polarization of reflected laser light from the recording medium 110. In a particular embodiment, the polarization conserving transducer 118 is adapted to record data to the recording medium 110 via the focused electro-magnetic radiation 120 and without using an applied magnetic write field.

In a particular example, testing has shown that helicity induced optical switching due to application of a polarized, focused light beam induces rotating electrical fields in various rare earth transition metal (TM) alloys, such as GaFeCo (i.e., Gadolinium, Iron, and Cobalt), TbFeCo (Terbium, Iron, and Cobalt), and SmCo$_5$ (Samarium and Cobalt). The magneto-crystalline anisotropy of SmCo$_5$ is comparable to that of FePt (Iron and Platinum), which has been used as a recording medium for heat assisted magnetic recording applications. Accordingly, the polarized light beam can be used for helicity induced optical switching to optically record data to the storage medium 110. In a particular embodiment, such light beam induced optical switching can enable very high storage densities. For example, in particular applications, such helicity induced optical switching has the potential to enable storage densities of several Terabits (Tb) per square inch provided that the employed laser pulses are focused to spot sizes on the order of approximately 10 nm while maintaining the circular polarization of the light beam.

Figure 2:
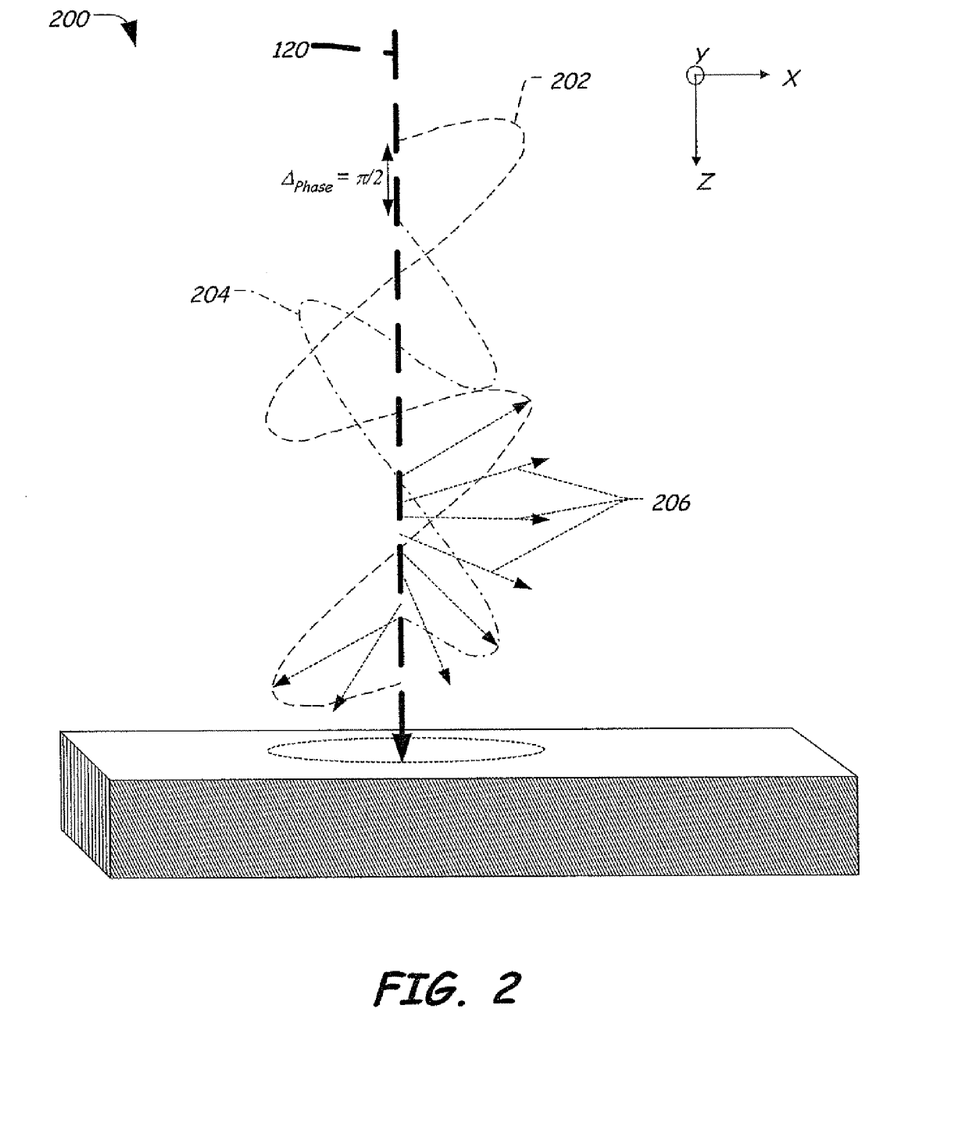
FIG. 2 is a diagram of a particular representative example of a polarized light beam directed onto a magnetic storage medium.

FIG. 2 is a diagram of a particular representative example of a polarized light beam 200 directed onto a storage medium, such as the polarized electro-magnetic radiation 120 directed onto the storage medium 110 illustrated in FIG. 1. The light beam 200 includes an electrical field component 202 and a magnetic field component 204 associated with the polarized electro-magnetic radiation 120. As shown, the electrical field component 202 is out of phase with the magnetic field component 204, causing rotation of an electric field vector 206 that has a relatively fixed amplitude and a direction that varies (rotates). In a particular example, the electrical field component 202 and the magnetic field component 204 are approximately ninety (90) degrees (□/2 radians) out of phase. The electric field vector 206 is circularly polarized since the tip of the electric field vector is rotating with a constant amplitude.

In a particular embodiment, the polarized electro-magnetic radiation 120 can achieve spot sizes of approximately 35 nm². Further, the polarized electro-magnetic radiation 120 enables efficient coupling of the focused light into the recording medium 110, allowing the light to be used to induce a rotating electrical field within the storage medium 110, where the induced rotating electrical field represents a data value. In a particular example, the focused light can be used to write data to the magnetic storage medium without applying a magnetic write field.

Figure 3:
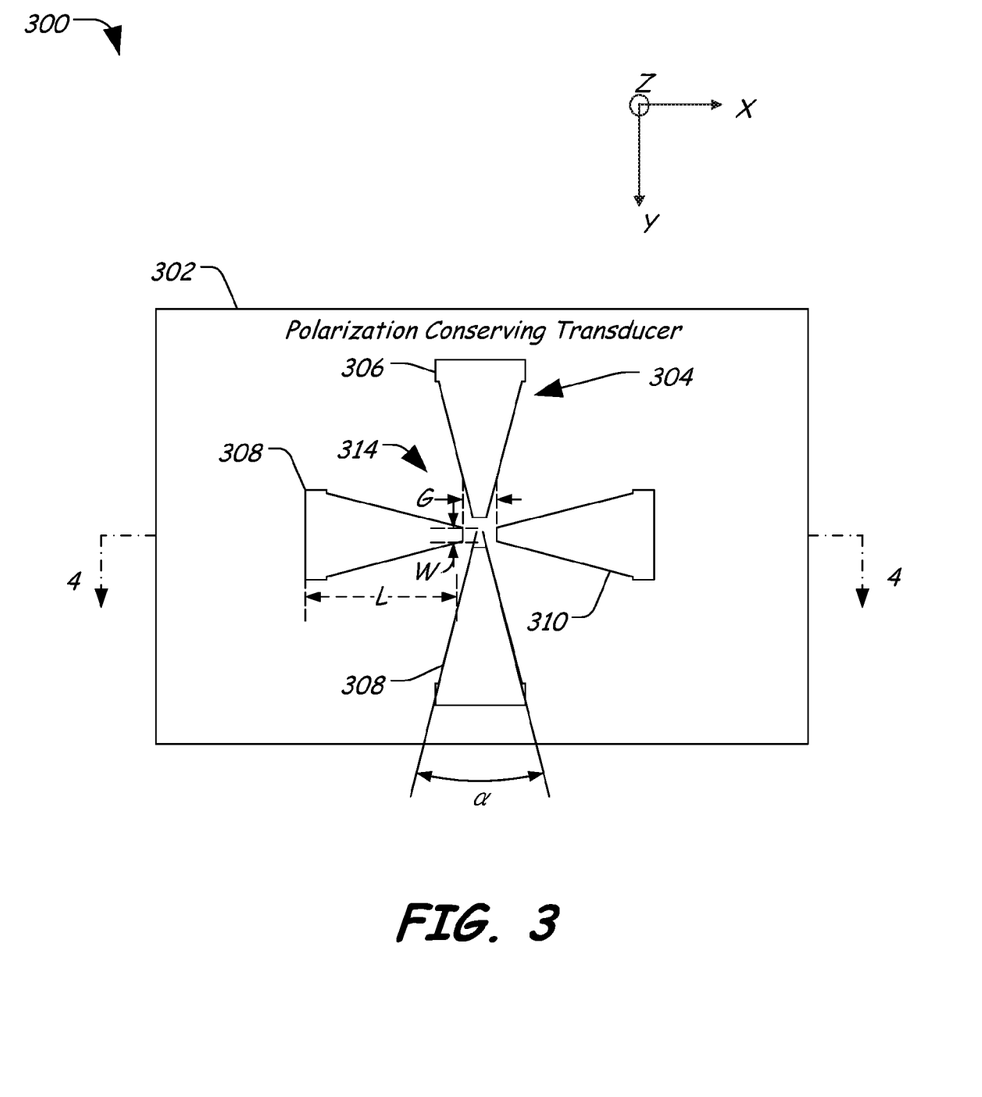
FIG. 3 is a top view of a particular illustrative embodiment of an angled, polarization conserving, double bow-tie transducer for optical recording on magnetic storage medium.

FIG. 3 is a top view of a particular illustrative embodiment of a portion of a waveguide 300 including an angled, polarization conserving, double bow-tie transducer 304 for optical recording on magnetic storage medium. The waveguide 300 includes dielectric material 302 on which the transducer 304 is formed. The transducer 304 includes a plurality of blades 306, 308, 310, and 312 arranged symmetrically about a center gap 314. The blades 306, 308, 310, and 312 are deposited at the bottom of a solid immersion lens (SIL) and are adapted to receive a focused and polarized light beam from the SIL.

The blades 306 and 310 represent a first antenna, and the blades 308 and 312 represent a second antenna. The first and second antennas are arranged orthogonally and are formed at an angle relative to a plane of the associated storage medium. Each of the blades 306, 308, 310 and 312 are formed from deposits of a material having a high optical conductivity, such as a noble metal (i.e., a metal that has a d-orbital band that is filled with electrons that do not cross a Fermi level) or aluminum. Examples of noble metals include Gold, Silver, and Copper.

In a particular embodiment, each of the blades 306, 308, 310, and 312 are formed from 50 nm thick deposits of gold, and the center gap 314 is approximately 20 nm wide. Further, in this embodiment, each of the blades 306, 308, 310, and 312 are formed at an angle ($\beta$) of approximately 20 degrees relative to a plane associated with the storage medium. Additionally, each of the blades 306, 308, 310, and 312 has a length (L) of approximately 200 nm, an apex width (w) of approximately 5 nm, and an apex (taper) angle ($\alpha$) of approximately 30 degrees.

Figure 4:
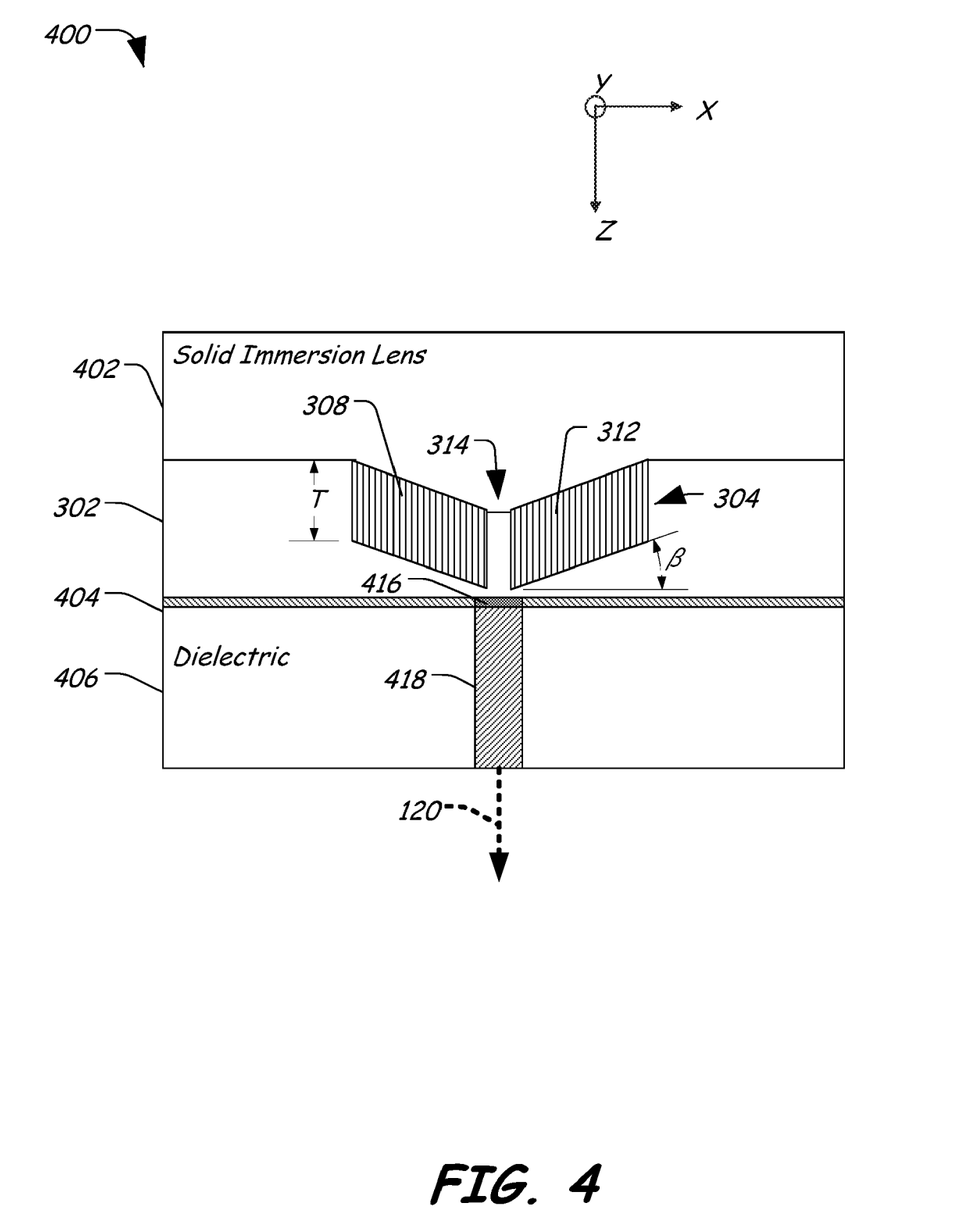
FIG. 4 is a cross-sectional side view of a portion of the angled, polarization conserving, double bow-tie transducer illustrated in FIG. 3, taken along line 4-4 in FIG. 3.

FIG. 4 is a cross-sectional side view of a portion of a waveguide 400 including the angled, polarization conserving, double bow-tie transducer 304 taken along line 4-4 in FIG. 3. The waveguide 400 includes a solid immersion lens 402, and the transducer 304 is formed on a first dielectric material layer 302 at a tip of the solid immersion lens 402. The waveguide 400 further includes a second dielectric material layer 404 coupled to the first dielectric material layer 302 and includes a third dielectric material layer 406 coupled to the second dielectric material layer 404. The second and third dielectric material layers 404 and 406 further include a second waveguide portion 418 disposed below the center gap 314 of the transducer 304.

The transducer 304 includes an antenna formed by the blades 308 and 312 that have a blade angle ($\beta$) within a range from zero degrees to 45 degrees. In a particular embodiment, the blades 308 and 312 have an angle ($\beta$) of approximately 20 degrees and have a thickness (T) of approximately 50 nm. In an example, the dimensions of the blades 308 and 312, the blade angle ($\beta$), and/or a size of the center gap 314 govern resonance behavior of the focused, polarized electro-magnetic beam. By adjusting the thickness of the blades 308 and 312, size, and/or the blade angle ($\beta$), the intensity and focus area of the polarized light at the surface of the storage medium can be adjusted.

Figure 5:
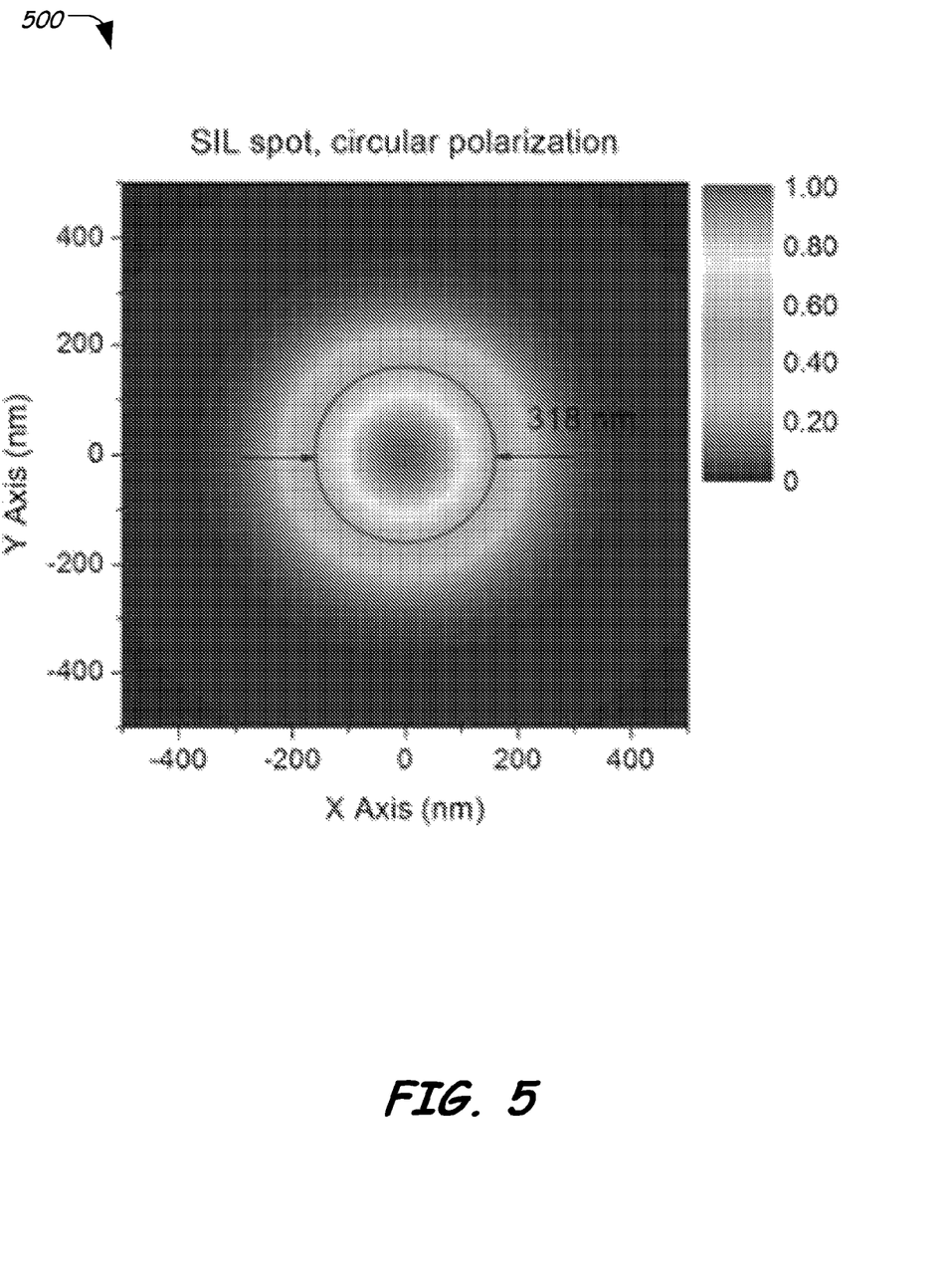
FIG. 5 is a graph of a particular illustrative embodiment of an intensity distribution of a light beam in an X-direction and Y-direction on a surface of the storage medium, where the light beam has a wavelength of 750 nm focused by a solid immersion lens (SIL)

FIG. 5 is a graph 500 of a particular illustrative embodiment of an intensity distribution of a light beam in an X-direction and Y-direction on a surface of the storage medium, where the light beam has a wavelength of 750 nm focused by a solid immersion lens (SIL). In this example, the recording medium included a 10 nm layer of Cobalt (Co) on top of a gold heat sink and the light beam traversed an air gap of 7.5 nm. The graph 500 shows that the light focused by the solid immersion lens achieved an intense focal area having a diameter of approximately 318 nm.

Figure 6:
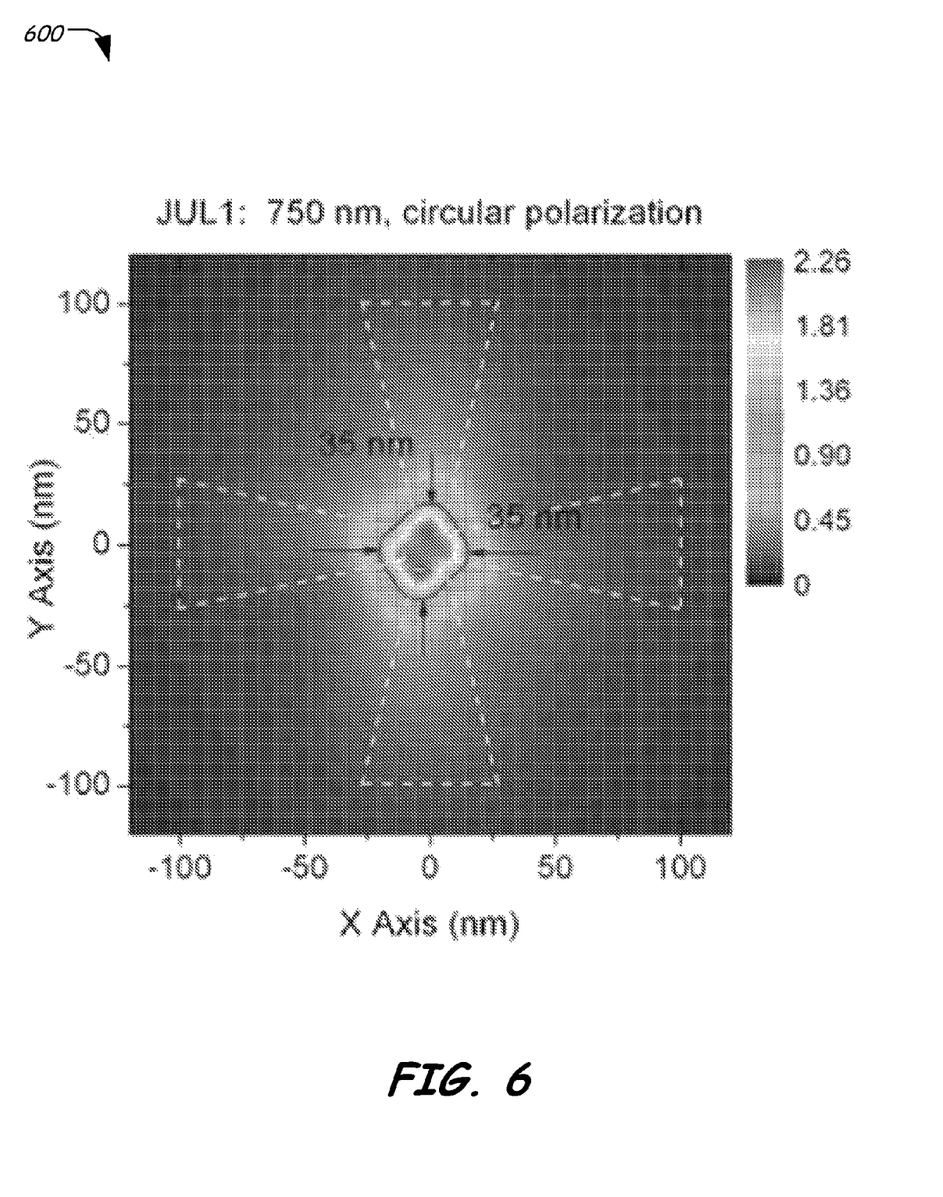
FIG. 6 is a graph of a particular illustrative embodiment of an intensity distribution of the 750 nm light beam of FIG. 5 in an X-direction and Y-direction on a surface of the storage medium, where the light beam is focused by the SIL onto the polarization conserving double bow-tie transducer.

FIG. 6 is a graph 600 of a particular illustrative embodiment of an intensity distribution of the 750 nm light beam of FIG. 5 at the top-most media layer of the storage medium, where the light beam is directed by the solid immersion lens onto the polarization conserving double bow-tie transducer. The graph 600 represents an intensity distribution at a recording medium consisting of Cobalt (Co) on top of a gold heat sink, where the light beam traverses an air gap of 7.5 nm between the apex of the blades (bow ties) and the surface of the storage medium. In particular, the graph 600 assumes a transducer having an orthogonal antenna arrangement, such as the symmetric arrangement of the blades 306, 308, 310, and 312 illustrated in FIG. 3. The graph 600 shows that the orthogonal antennas yield a strongly enhanced intensity profile as compared to the profile of the solid immersion lens alone (illustrated in FIG. 5). In particular, the intensity profile illuminates a surface area having a diameter of approximately 35 nm, which is smaller than the focal area of the solid immersion lens alone by almost an order of magnitude.

Since helicity induced optical switching depends on the intensity of the light and not on the temperature (since elevated temperature can actually degrade the recording performance by adding noise), the rectangular shape of the intensity profile illustrated in FIG. 6 can yield almost perfectly straight transitions when rotated by approximately 45 degrees. By using polarization conserving transducer in conjunction with a solid immersion lens, the intensity profile of the light beam at the surface of the storage medium can be tightly controlled to write data to the storage medium.

Figure 7:
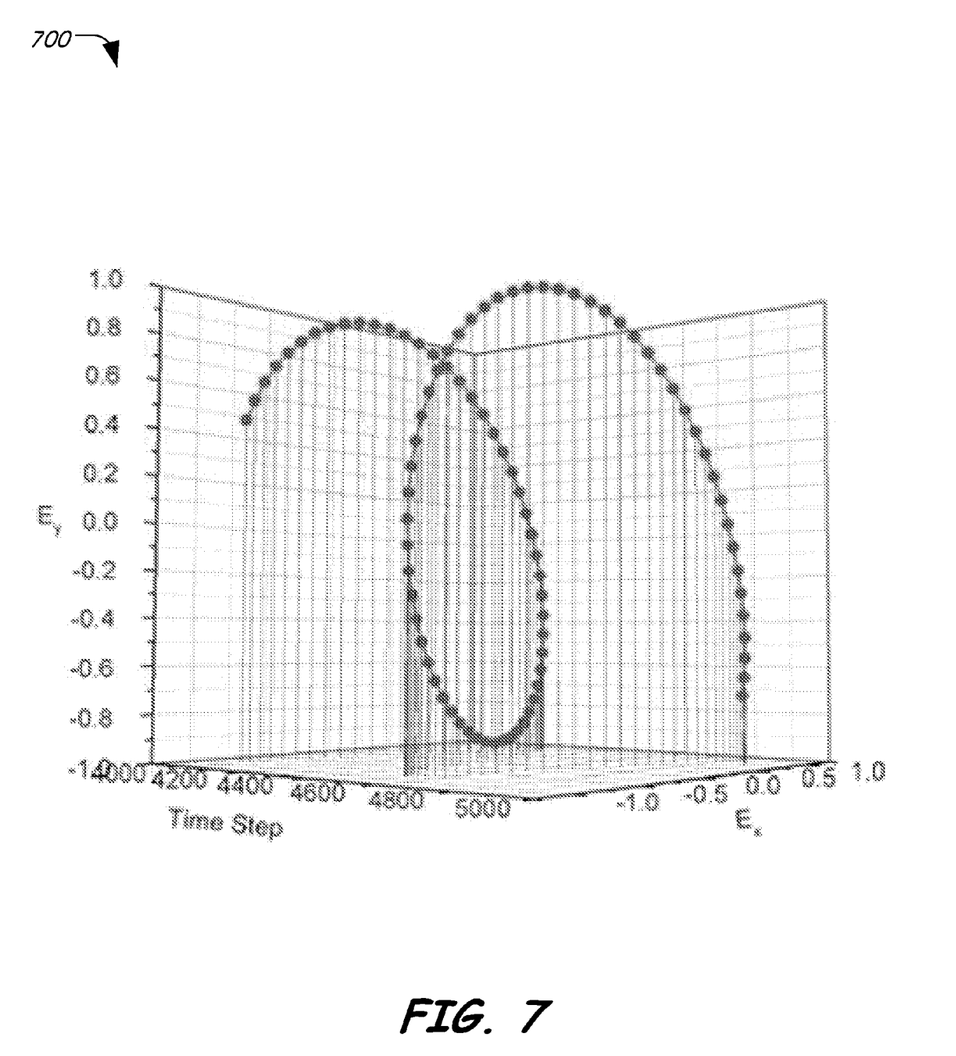
FIG. 7 is a graph of a particular illustrative embodiment of a three-dimensional graph of an induced electrical field within the storage medium in the X-direction, the Y-direction, and relative to time, where the light beam was focused using the polarization conserving double bow-tie transducer.

FIG. 7 is a graph 700 of a particular illustrative embodiment of a three-dimensional graph of an induced electrical field 702 within the storage media in the X-direction, the Y-direction, and relative to time, where the light beam is focused using a solid immersion lens to focus the light beam onto a polarization conserving double bow-tie transducer. The graph 700 was generated based on the recording media structure of FIG. 6, including a layer of Cobalt on top of a gold heat sink. The graph 700 demonstrates that the circular polarization of the incoming radiation is conserved perfectly within the recording layer within the X-Y plane.

The bow-tie (orthogonal antenna) arrangement, which was illustrated in FIGS. 3 and 4 above, conserves the polarization of the light when transitioning from the solid immersion lens into the recording medium. Since the polarization is conserved, time reversal arguments suggest that it can also conserve the polarization for light reflected from the medium back into the solid immersion lens. Moreover, calculations indicate that the presence of a recording medium within the near field of the transducer does cause a change in the intensity of the light reflected from the transducer on the order of five (5) percent of the incident light, so a significant amount of the reflected light is interacting with the recording medium.

Conventionally, high areal densities for data recording can be limited by the ability to retrieve recorded information from the storage medium. The problem is not related to fundamental limitations of conventional magnetic readers that are based on giant or tunnel-magneto-resistance, but to the fact that the resolution of the readers strongly depends on the distance to the recording medium 110. Since the reader and writer are usually spatially separated, a controller of the storage device has to control a distance of both elements to the recording medium 110 to obtain a desired read/write performance.

However, since the polarization for the light is conserved for light reflected back from the storage medium when the double-bow tie transducer is used to conserve polarization of the light beam for optically inducing a rotating electrical field in the recording medium, the double bow tie device can also be used in conjunction with magneto-optical read back schemes by analyzing the polarization state of the reflected light. Hence, the resolution problem can be overcome by using the optical writer to also read data from the recording medium.

Further, although the symmetry of the double-bow tie (orthogonal antennas) is desirable for maintaining the symmetry of the electrical field vector within the recording medium as it rotates in time, other configurations can also be envisioned that have three or more blades and that will also generate rotating field patterns within the recording medium.

Figure 8A:
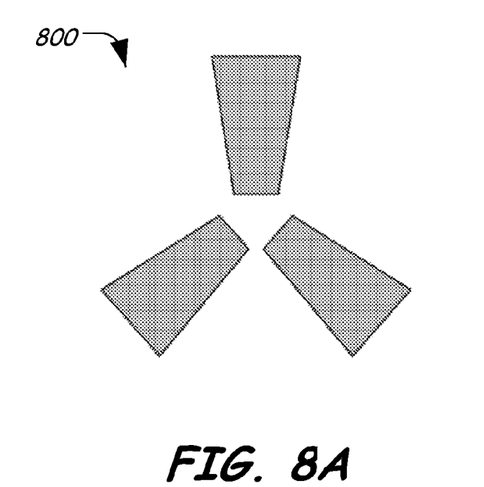
FIGS. 8A-8C are diagrams of alternative polarization conserving transducers for generating a rotating electrical field in the storage medium.
Figure 8B:
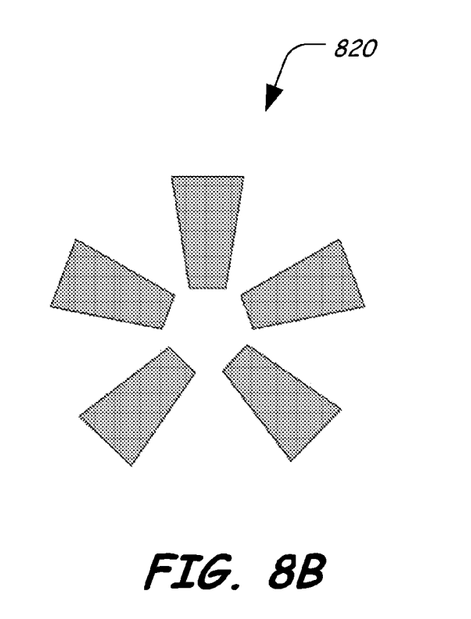
Figure 8C:
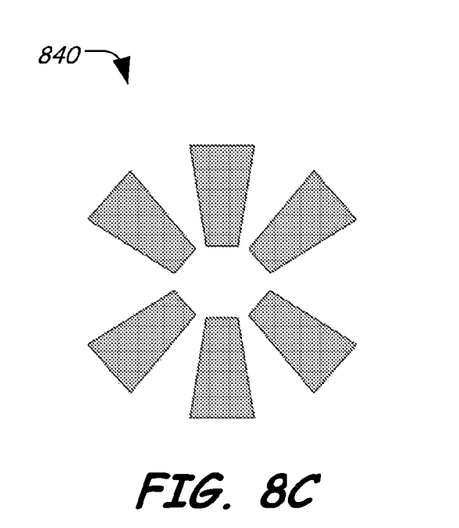

FIGS. 8A-8C are diagrams of alternative polarization conserving transducers for generating a rotating electrical field in the storage media. In FIG. 8A, a transducer 800 is illustrated that includes three blades arranged symmetrically about a center gap. In FIG. 8B, a transducer 820 is shown that includes five blades arranged symmetrically about the center gap. In FIG. 8C, a transducer 840 is shown that includes six blades arranged symmetrically about a center gap.

In a particular embodiment, the symmetric blades conserve the polarization of the electrical field vector as it rotates in time. By increasing the number of blades, the amplitude of the rotating field is maintained more nearly constant in time, which is beneficial. However, increasing the number of blades may also result in an increased size of the center gap, assuming that there may be a minimum taper width that can be fabricated for each blade. Since the size of the center gap partially determines the spot size at the storage medium, the increased size of the center gap may be undesirable and may adversely impact the areal density of the recording medium. Accordingly, an increased center gap may be undesirable, depending on the implementation. The particular specifications of the recording system will define the tradeoffs for choosing specific transducer geometries.

Figure 9:
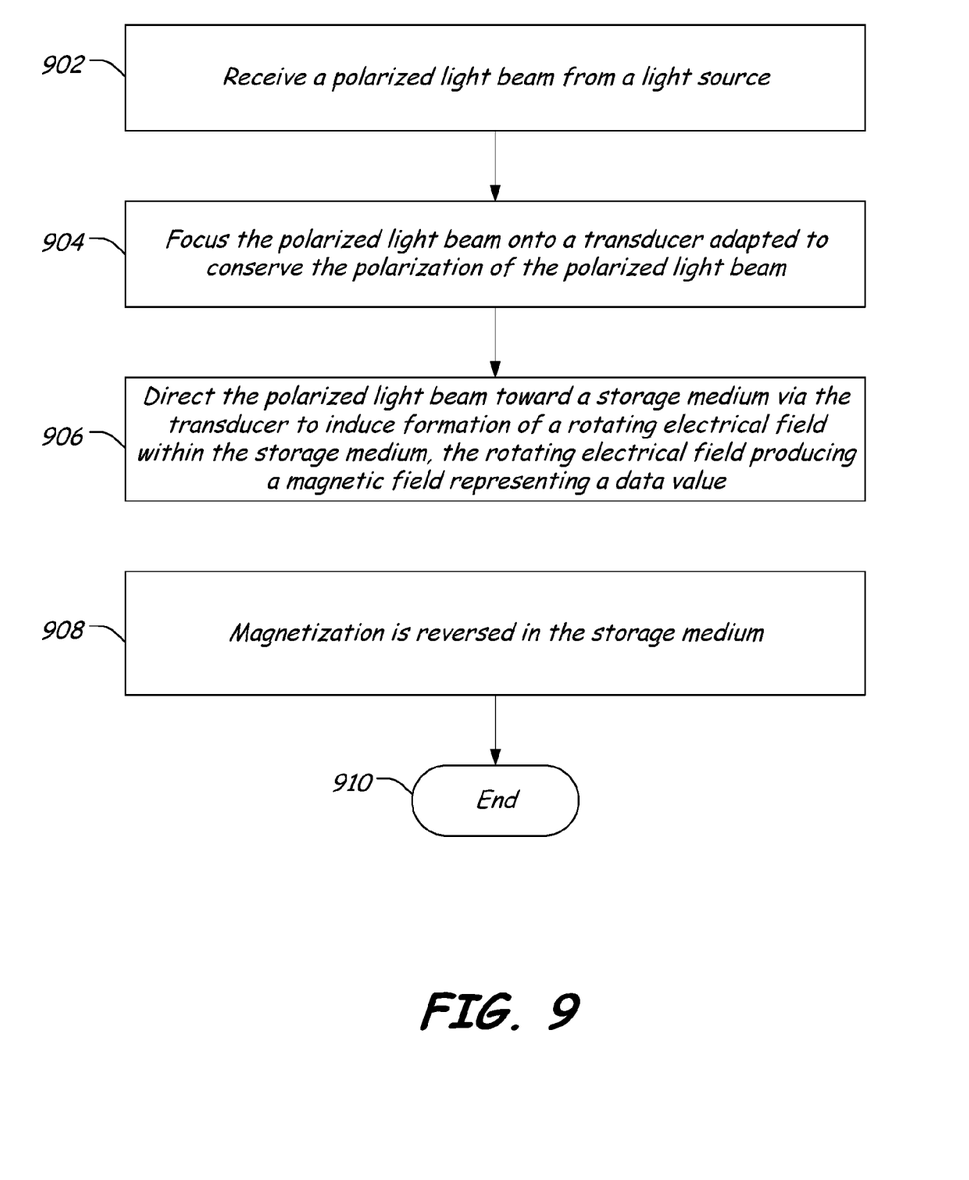
FIG. 9 is a flow diagram of a particular illustrative embodiment of a method of optically recording data to a magnetic storage medium.

FIG. 9 is a flow diagram of a particular illustrative embodiment of a method of optically recording data to a magnetic storage media. At 902, a polarized light beam is received from a light source. In a particular embodiment, the polarized light beam is a laser beam, an evanescent waveform, or another type of focused light beam. Advancing to 904, the polarized light beam is focused onto a transducer adapted to conserve the polarization of the polarized light beam. In a particular example, the transducer includes multiple optically conductive blades to receive the focused light beam and to conserve a circular polarization associated with the focused light beam. In an example, the conductive blades may be formed from a noble metal, such as gold or aluminum. In another particular example, the polarized light beam is focused using a solid immersion lens, a parabolic mirror, another focusing element, or any combination thereof.

Continuing to 906, the polarized light beam is directed toward a storage medium via the transducer to induce formation of a rotating electrical field within the storage medium, where the rotating electrical field produces a magnetic field (or moment) representing a data value. In a particular example, data is recorded to the storage medium via helicity induced optical switching. The method terminates at 908.

In a particular embodiment, by retaining the polarization state of the polarized light beam, the transducer allows for recording of data to a recording medium having a high anisotropy with reduced heating relative to conventional heat-assisted magnetic recording. Further, by retaining the polarization state of the polarized light beam, the transducer can be more efficient at lower temperatures as compared to a heat-assisted magnetic recording process that is more efficient at higher temperatures.

Figure 10:
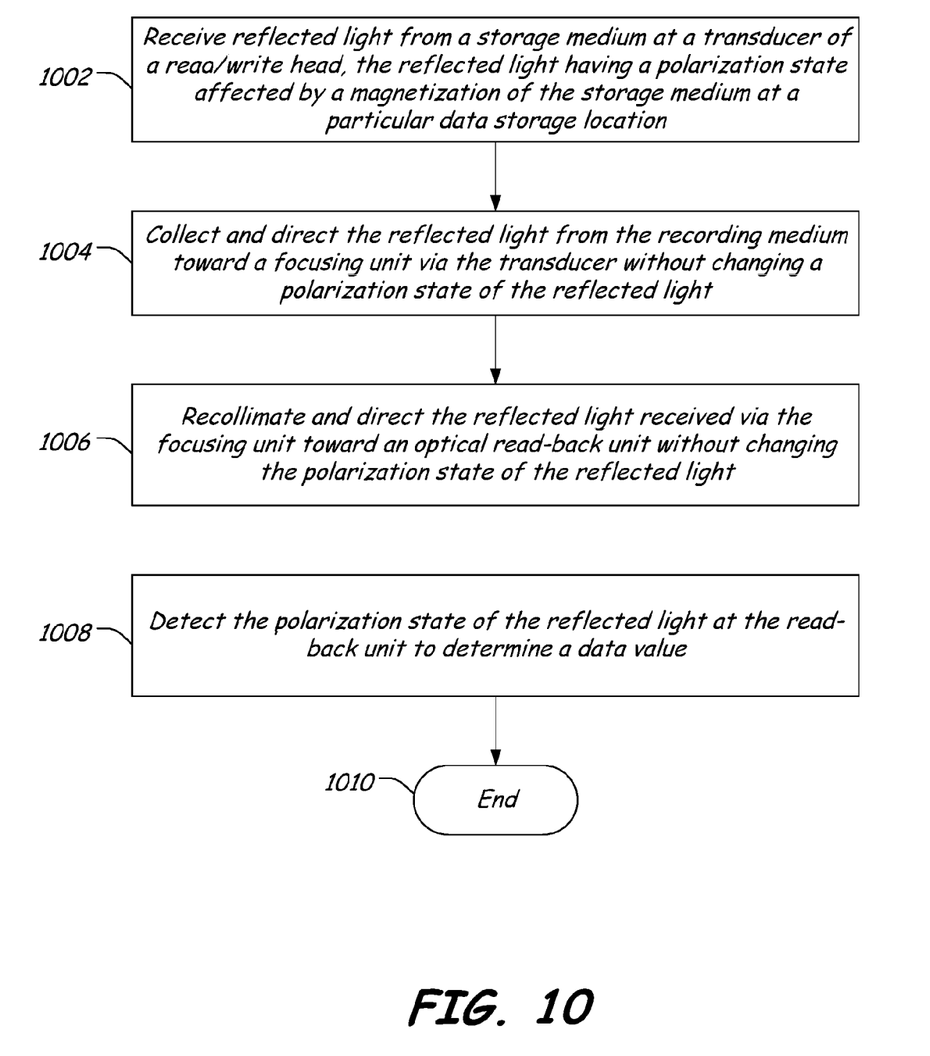
FIG. 10 is a flow diagram of a particular illustrative embodiment of a method of optically reading data from a magnetic storage media.

FIG. 10 is a flow diagram of a particular illustrative embodiment of a method of optically reading data from a magnetic storage media. At 1002, reflected light from a storage media is received at a transducer of a read/write head, where the reflected light has a polarization state affected by a magnetization of the storage medium at a particular data storage location. Advancing to 1004, the reflected light from the recording medium is collected and directed toward a focusing unit via the transducer without changing the polarization state of the reflected light. Continuing to 1006, the reflected light received via the focusing unit is recollimated and directed toward an optical read-back unit without changing the polarization state of the reflected light. Proceeding to 1008, the polarization state of the reflected light is detected at the read-back unit to determine a data value. The method terminates at 1010.

In this particular example, the transducer used to write data to the storage medium can also be used to read back the data based on a polarization state of reflected light from the storage medium. In this particular embodiment, the magnetization of the storage medium can affect the polarization state of the light, such that the resulting polarization state of the reflected light represents the data stored via the storage medium.

Figure 11:
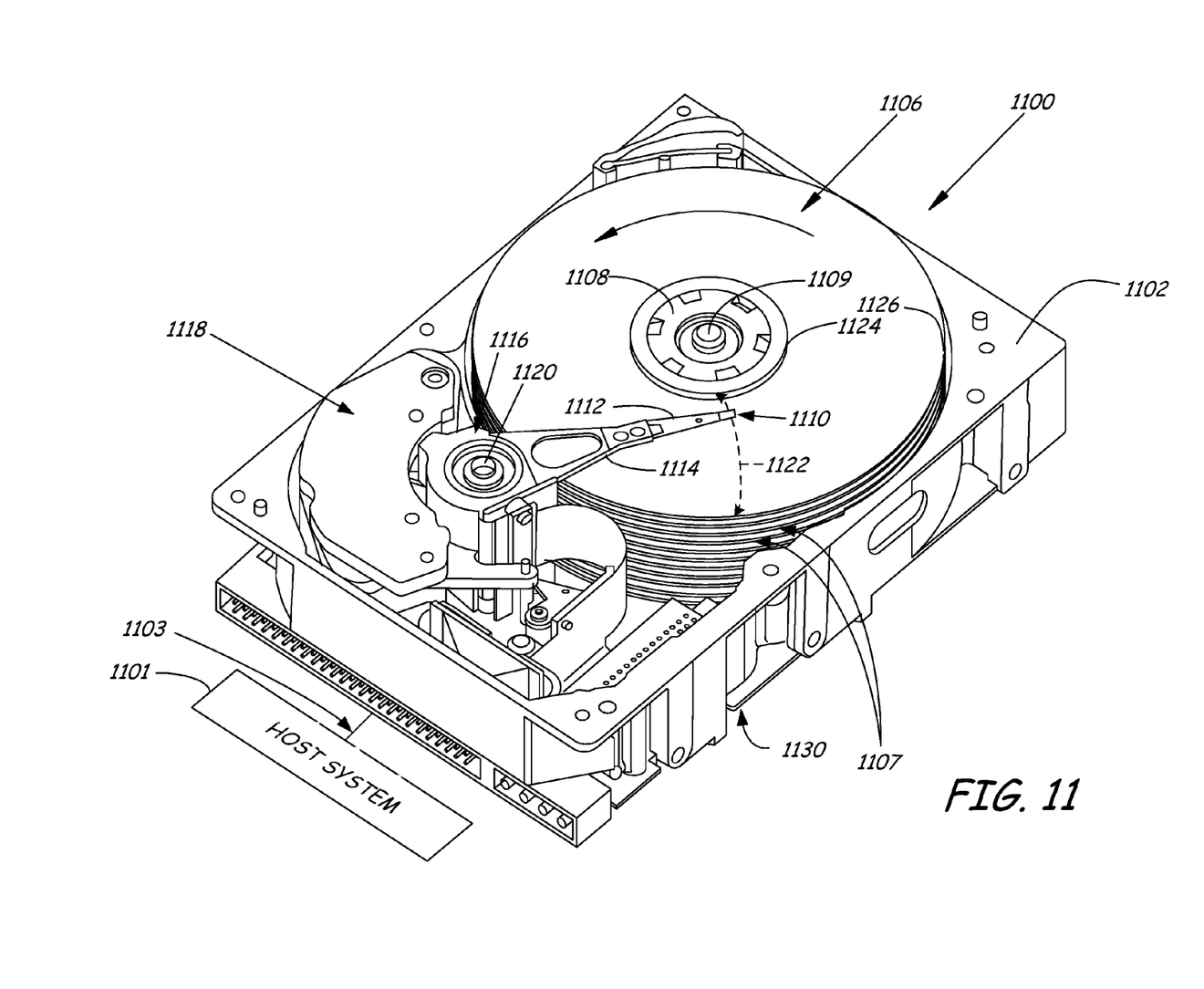
FIG. 11 is an isometric view of a disc drive with which the polarization conserving near field transducer can be used to optically record data to a magnetic storage media.

FIG. 11 is an isometric view of a disc drive 1100 with which the polarization conserving near field transducer can be used to optically record data to a magnetic storage media. Disc drive 1100 includes a housing with a base 1102 and a top cover (not shown). Disc drive 1100 further includes a disc pack 1106, which is mounted on a spindle motor (not shown) by a disc clamp 1108. Disc pack 1106 includes a plurality of individual discs, which are mounted for co-rotation about central axis 1109. Each disc surface has an associated disc head slider 1110 which is mounted to disc drive 1100 for communication with the disc surface. In the example shown in FIG. 11, sliders 1110 are supported by suspensions 1112 which are in turn attached to track accessing arms 1114 of an actuator 1116. The actuator shown in FIG. 11 is of the type known as a rotary moving coil actuator and includes a voice coil motor (VCM), shown generally at 1118. Voice coil motor 1118 rotates actuator 1116 with its attached heads 1110 about a pivot shaft 1120 to position heads 1110 over a desired data track along an arcuate path 1122 between a disc inner diameter 1124 and a disc outer diameter 1126. Voice coil motor 1118 is driven by servo electronics 1130 based on signals generated by heads 1110 and a host system 1101.

The disc head slider 1110 supports a recording head that includes a waveguide with a solid immersion lens and a polarization conserving transducer, such as the transducer 118 illustrated in FIG. 1 and the transducers 304, 412, 800, 820, and 840 illustrated in FIGS. 3, 4, and 8, respectively. The transducer includes three or more conductive blades or panels that are symmetric about a center gap to generate and direct a circularly polarized light beam toward the recording medium to induce a rotating electrical field within the recording medium. The transducer allows data to be written optically to a magnetic storage medium by inducing the rotating electrical field within the storage medium. A control circuit included with the servo electronics 1130 or co-located with the servo electronics 1130 along a bottom portion of the disc drive 1100 may be used to control a position of the slider 1110 and the associated read/write head relative to one of the individual discs 1107 of the disc pack 1106. Further, the servo electronics 1130 are adapted to control the light source to control the polarization of the light source to write particular data to one of the individual discs 1107.

In conjunction with the transducer, the storage device, and the methods disclosed herein, the transducer is adapted to receive a circularly polarized light beam and to direct and focus the circularly polarized light beam onto a surface of a storage medium while conserving polarization of the light beam. The transducer includes multiple blades arranged symmetrically about a center gap at a tip of a solid immersion lens and formed at an angle relative to a plane of the storage medium. In a particular example, the transducer includes three or more blades formed from a noble metal and adapted to optically conduct the focused light toward the surface of the storage medium. The focused polarized light beam induces formation of a rotating electrical field within the storage medium, which rotating electrical field represents a data value. Thus, data can be optically written to a magnetic storage medium without heating of the storage medium via helicity induced optical switching. In a particular embodiment, the transducer allows for recording of data to a recording medium having a high anisotropy and is more efficient at lower temperatures as compared to a heat-assisted magnetic recording process that is more efficient at higher temperatures.

Although the present invention has been described with reference to preferred embodiments, workers skilled in the art will recognize that changes may be made in form and detail without departing from the spirit and scope of the invention.

What is claimed is:

1. A system comprising:
    a recording medium;
    a head movable relative to the recording medium, the head adapted to focus polarized light onto a surface of the recording medium to record data via helicity induced optical switching that induces formation of a rotating electrical field within the recording medium thereby producing a magnetic moment in the recording medium to represent a data value, receive reflected light from a recording medium having a polarization state affected by a magnetization of the storage medium, and direct the received reflected light to a read-back unit without changing the polarization state; and
    the read-back unit adapted to detect the polarization state of the reflected light to determine a data value represented by the magnetization of the storage medium.

2. The system of claim 1, wherein the helicity induced optical switching relies on light intensity and not heat to produce the rotating electrical field.

3. The system of claim 1, wherein the head includes a polarization conserving transducer adapted to direct a polarized laser beam from a light source onto the recording medium while conserving polarization of the polarized laser beam.

4. The system of claim 3, wherein the polarization conserving transducer comprises a first antenna and a second antenna arranged orthogonally, each antenna comprising:
    two optically conductive blades arranged symmetrically about a center gap and formed at a blade angle relative to a plane of the recording medium.

5. The system of claim 3, wherein the head further comprises a waveguide normal to the surface of the recording medium, the waveguide including a solid immersion lens to focus the polarized laser beam onto the polarization conserving transducer.

6. The system of claim 3, wherein the polarization conserving transducer comprises at least three optically conductive blades arranged symmetrically about a center gap.

7. The system of claim 6, wherein the blade angle and a size of the center gap determine a spot size of the polarized light at the surface of the recording media.

8. A waveguide comprising:
    a solid immersion lens;
    an optical transducer comprising a plurality of optically conductive blades arranged symmetrically about a center gap on a first dielectric material that is at a tip of the solid immersion lens, the optical transducer to:
        receive polarized light from the solid immersion lens; and to focus the polarized light onto a recording medium, the polarized light inducing formation of a rotating electrical field within the recording medium via helicity induced optical switching;

a second dielectric material coupled to the first dielectric material;

a third dielectric material coupled to the second dielectric material; and a waveguide portion in the second dielectric material and the third dielectric material below the center gap.

9. The optical transducer of claim 8, wherein the rotating electrical field represents a data value.

10. The optical transducer of claim 8, wherein a focal area at a surface of the recording medium has a diameter of approximately 35 nm.

11. The optical transducer of claim 8, wherein each of the plurality of optically conductive blades has a length of approximately 200 nm, an apex width of approximately 5 nm, a taper angle of approximately 30 degrees along the length, and a thickness of approximately 50 nm, and wherein the center gap has a diameter of approximately 20 nm.

12. The optical transducer of claim 8, wherein each of the plurality of optically conductive blades has a blade angle relative to a plane of the storage medium that is within a range from zero degrees to forty-five degrees.

13. A system comprising:

a head adapted to focus polarized light onto a surface of a recording medium to record data via helicity induced optical switching that relies on light and not heat to induce formation of a rotating electrical field within the recording medium that produces a magnetic moment in the recording medium to represent a data value, receive reflected light from a recording medium having a polarization state affected by a magnetization of the storage medium, and direct the received reflected light to a read-back unit without changing the polarization state; and the read-back unit adapted to detect the polarization state of the reflected light to determine a data value represented by the magnetization of the storage medium, wherein the head includes a polarization conserving transducer adapted to direct a polarized laser beam from a light source onto the recording medium while conserving polarization of the polarized laser beam.

14. The system of claim 13, wherein the polarization conserving transducer comprises a first antenna and a second antenna arranged orthogonally, each antenna comprising:

two optically conductive blades arranged symmetrically about a center gap and formed at a blade angle relative to a plane of the recording medium.

15. The system of claim 13, wherein the head further comprises a waveguide normal to the surface of the recording medium, the waveguide including a solid immersion lens to focus the polarized laser beam onto the polarization conserving transducer.

16. The system of claim 13, wherein the polarization conserving transducer comprises at least three optically conductive blades arranged symmetrically about a center gap.

17. The system of claim 16, wherein the blade angle and a size of the center gap determine a spot size of the polarized light at the surface of the recording media.

* * * * *